(12) United States Patent
Huang et al.

(10) Patent No.: US 11,340,114 B2
(45) Date of Patent: May 24, 2022

(54) SPECTRUM MEASUREMENT SYSTEM

(71) Applicant: PROTRUSTECH CO., LTD, Tainan (TW)

(72) Inventors: Chun-Ta Huang, Tainan (TW);
Wei-Hsin Wang, Tainan (TW);
Chien-Chung Chang, Taichung (TW)

(73) Assignee: PROTRUSTECH CO., LTD, Tainan (TW)

( * ) Notice: Subject to any disclaimer, the term of this patent is extended or adjusted under 35 U.S.C. 154(b) by 19 days.

(21) Appl. No.: 16/879,777

(22) Filed: May 21, 2020

(65) Prior Publication Data
US 2020/0370962 A1 Nov. 26, 2020

(30) Foreign Application Priority Data

May 22, 2019 (TW) .................................. 108117712

(51) Int. Cl.
| | |
|---|---|
| *G01J 3/44* | (2006.01) |
| *G01J 3/02* | (2006.01) |
| *G01N 21/65* | (2006.01) |

(52) U.S. Cl.
CPC ............... *G01J 3/44* (2013.01); *G01J 3/0235* (2013.01); *G01N 21/658* (2013.01); *G01N 2201/06113* (2013.01)

(58) Field of Classification Search
CPC .................................. G01N 21/65; G01J 3/44
See application file for complete search history.

(56) References Cited

U.S. PATENT DOCUMENTS

| | | | |
|---|---|---|---|
| 6,407,868 B1 * | 6/2002 | Ishibashi | ................... G02B 5/04 353/33 |
| 7,133,130 B2 | 11/2006 | Storz et al. | |
| 8,920,050 B2 * | 12/2014 | Takeuchi | ............. G02B 6/3801 385/99 |

(Continued)

FOREIGN PATENT DOCUMENTS

| | | |
|---|---|---|
| EP | 2201352 | 8/2018 |
| WO | 2014189379 | 11/2014 |

(Continued)

OTHER PUBLICATIONS

E. L. Sebern, "Tissue modification with feedback: the Smart Scalpel", 1998 SPIE. (Year: 1998).*

*Primary Examiner* — Maurice C Smith
(74) *Attorney, Agent, or Firm* — JCIPRNET

(57) ABSTRACT

A spectrum measurement system includes a laser light source system, an optical signal receiving system and a beam splitting system. The laser light source system is configured to emit a laser output light beam to the object. The laser output light beam includes at least one of a first and a second peak-wavelength laser. After the object is radiated by the laser output light beam, the object generates a conversion beam. The conversion beam includes at least one of a first and a second spectral signals. The optical signal receiving system includes at least a first and a second signal receivers being respectively configured to receive the first and the second spectral signals. The beam splitting system provides a plurality of light exiting paths being configured to respectively transmit the first and the second spectral signals to the first and the second signal receivers.

11 Claims, 7 Drawing Sheets

(56) References Cited

U.S. PATENT DOCUMENTS

| | | | | |
|---|---|---|---|---|
| 2012/0050733 A1* | 3/2012 | Takimoto | ............... | G01N 21/65 |
| | | | | 356/301 |
| 2013/0297254 A1* | 11/2013 | Vignesh | ................... | G01J 3/28 |
| | | | | 702/179 |
| 2016/0178517 A1 | 6/2016 | Deguchi et al. | | |
| 2016/0209330 A1 | 7/2016 | Huang et al. | | |
| 2018/0136138 A1* | 5/2018 | Zhao | ...................... | G01N 33/15 |
| 2018/0328786 A1* | 11/2018 | Lambert | ............... | G01J 3/0208 |

FOREIGN PATENT DOCUMENTS

| | | | | |
|---|---|---|---|---|
| WO | WO-2017199211 A1 * | 11/2017 | ........... | G01N 21/718 |
| WO | WO-2018065958 A1 * | 4/2018 | ......... | A61B 5/14555 |
| WO | WO-2019231512 A1 * | 12/2019 | ............ | G01J 3/0208 |

\* cited by examiner

SPECTRUM MEASUREMENT SYSTEM

CROSS REFERENCE TO RELATED APPLICATION

This application claims the priority benefit of Taiwan application serial no. 108117712, filed on May 22, 2019. The entirety of the above-mentioned patent application is hereby incorporated by reference herein and made a part of specification.

BACKGROUND OF THE INVENTION

1. Field of the Invention

The present invention relates to a spectrum measurement system.

2. Description of Related Art

With the development of technologies, different products have been developed. In order to detect the quality of the products, it is necessary to analyze material structures of these products, thus causing a large number of detection requirements. Since a spectrometer based on the optical principle is non-destructive during determination of the types of elements, structures or components of the products, the availability of the products may not be affected, and the spectrometer is widely used in all fields.

However, in a traditional spectrometer, firstly, a detection beam may irradiate an object, and then is converted into a conversion beam with object information. However, if a wavelength of the detection beam needs to be replaced to achieve other detections, the wavelength of the conversion beam is also changed correspondingly, so a corresponding signal receiver needs to be replaced. The above operation requires multiple optical fiber plugging and unplugging actions which also require multiple calibrations, so that the operation process is quite complicated, and rapid detection is difficult to realize. Moreover, the conventional spectrometer is bulky and expensive, which is not conducive to application of spectrometers.

SUMMARY OF THE INVENTION

The present invention provides a spectrum measurement system which is small in size and low in manufacturing cost and has a simple operation flow.

In one embodiment of the present invention, a spectrum measurement system is provided, including a laser light source system, an optical signal receiving system and a beam splitting system. The laser light source system is configured to emit a laser output light beam to an object. The laser output light beam includes at least one of a first peak-wavelength laser and a second peak-wavelength laser. After the object is radiated by the laser output light beam, the object generates a conversion beam. The conversion beam includes at least one of a first spectral signal and a second spectral signal. The first spectral signal is corresponded to the first peak-wavelength laser, and the second spectral signal is corresponded to the second peak-wavelength laser. The optical signal receiving system includes at least a first signal receiver and a second signal receiver respectively configured to receive the first spectral signal and the second spectral signal. The beam splitting system is located on a transmission path of the conversion beam. The beam splitting system provides a plurality of light exiting paths configured to respectively transmit the first and second spectral signals to the first and second signal receivers.

In one embodiment of the present invention, the spectral signals are Raman spectrums.

In one embodiment of the present invention, the beam splitting system includes a first beam splitter. The first beam splitter allows the first spectral signal in the conversion beam to penetrate through, and reflect other spectral signals.

In one embodiment of the present invention, the beam splitting system further includes a second beam splitter. The second beam splitter allow the second spectral signal in the conversion beam to penetrate through, and reflect other spectral signals.

In one embodiment of the present invention, the first signal receiver further includes a light filter element and a photoelectric conversion element. The light filter element is optically coupled to the beam splitting system. The light filter element is configured to filter out the first peak-wavelength laser entering from the beam splitting system. The photoelectric conversion element is configured to convert the first spectral signal into an electrical output signal.

In one embodiment of the present invention, the first signal receiver further includes an optical collimator and an optical signal channel. The optical collimator is optically coupled to the light filter element. The optical collimator is configured to receive and collimate the first spectral signal. The optical signal channel is optically coupled to the optical collimator and the photoelectric conversion element. The optical signal channel is configured to receive the first spectral signal from the optical collimator and output the first spectral signal to the photoelectric conversion element.

In one embodiment of the present invention, the spectrum measurement system further includes a processor and a display apparatus. The processor is electrically connected to the optical signal receiving system and the display apparatus. The processor is configured to receive the electrical output signal generated by the photoelectric conversion element, and generate an output curve according to the electrical output signal, and the output curve is displayed on the display apparatus.

In one embodiment of the present invention, the spectrum measurement system further includes a controller. The controller is configured to control whether the laser output light beam includes the first peak-wavelength laser or the second peak-wavelength laser.

In one embodiment of the present invention, the spectrum measurement system further includes a shell. The shell has a light inlet/outlet. The optical signal receiving system and the beam splitting system are disposed inside the shell. The position of the object is corresponded to the light inlet/outlet.

In one embodiment of the present invention, the laser light source system is disposed inside the shell.

In one embodiment of the present invention, the laser light source system is disposed outside the shell. The laser light source system further includes a plurality of light guide channels. The plurality of light guide channels are respectively optically coupled to these laser light sources and the shell. Each light guide channel is configured to guide the first or second peak-wavelength laser emitted by the laser light source system into the shell.

In one embodiment of the present invention, the spectrum measurement system further includes a plurality of adjusting mechanisms. These adjusting mechanisms are respectively disposed at a plurality of joints between these light guide channels and the shell. Each adjusting mechanism is configured to adjust the position of the corresponding light guide channel.

Based on the above, in the spectrum measurement system of the embodiment of the present invention, the beam splitting system provides the plurality of light exiting paths, and these light exiting paths are configured to respectively transmit the first and second spectral signals in the conversion beam to the first and second signal receivers. Therefore, the spectrum measurement system may simultaneously measure multiple wavelengths and avoid an action of replacing the signal receivers and corresponding optical fiber plugging, unplugging and collimating flows, so that the spectrum measurement system may provide a simple operation flow for a user.

In order to make the aforementioned features and advantages of the present invention more comprehensible, embodiments accompanied with figures are described in detail below.

DESCRIPTION OF THE EMBODIMENTS

In order to facilitate the description of configurations of a spectrum measurement system of the embodiment of the present invention, the spectrum measurement system may be regarded as being located in a space composed of directions D1, D2 and D3, wherein every two of the directions D1, D2 and D3 are perpendicular to each other.

Figure 1A:
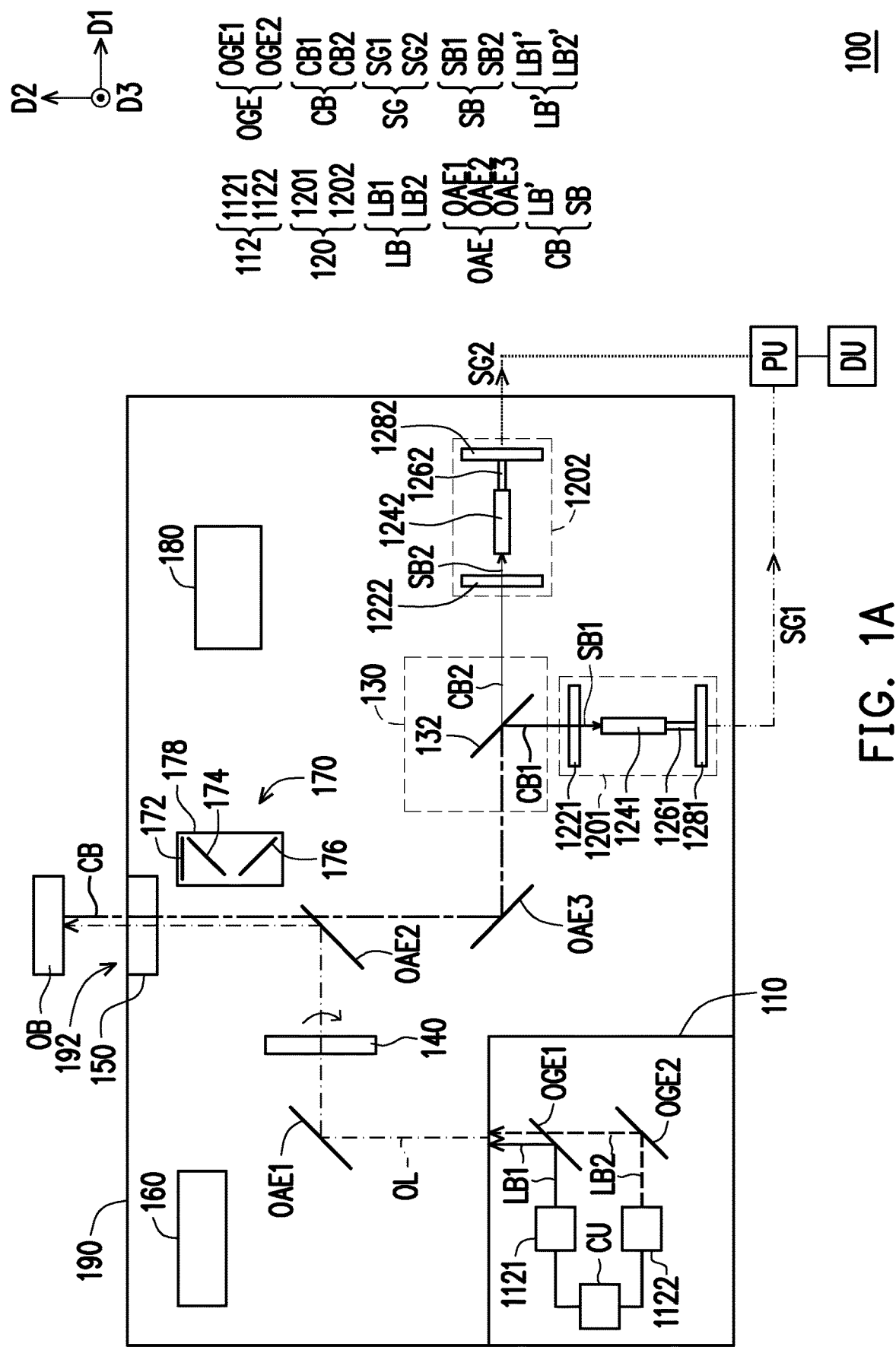
FIGS. 1A and 1B are schematic diagrams of light paths of a spectrum measurement system under different operation modes of one embodiment of the present invention.
Figure 1B:
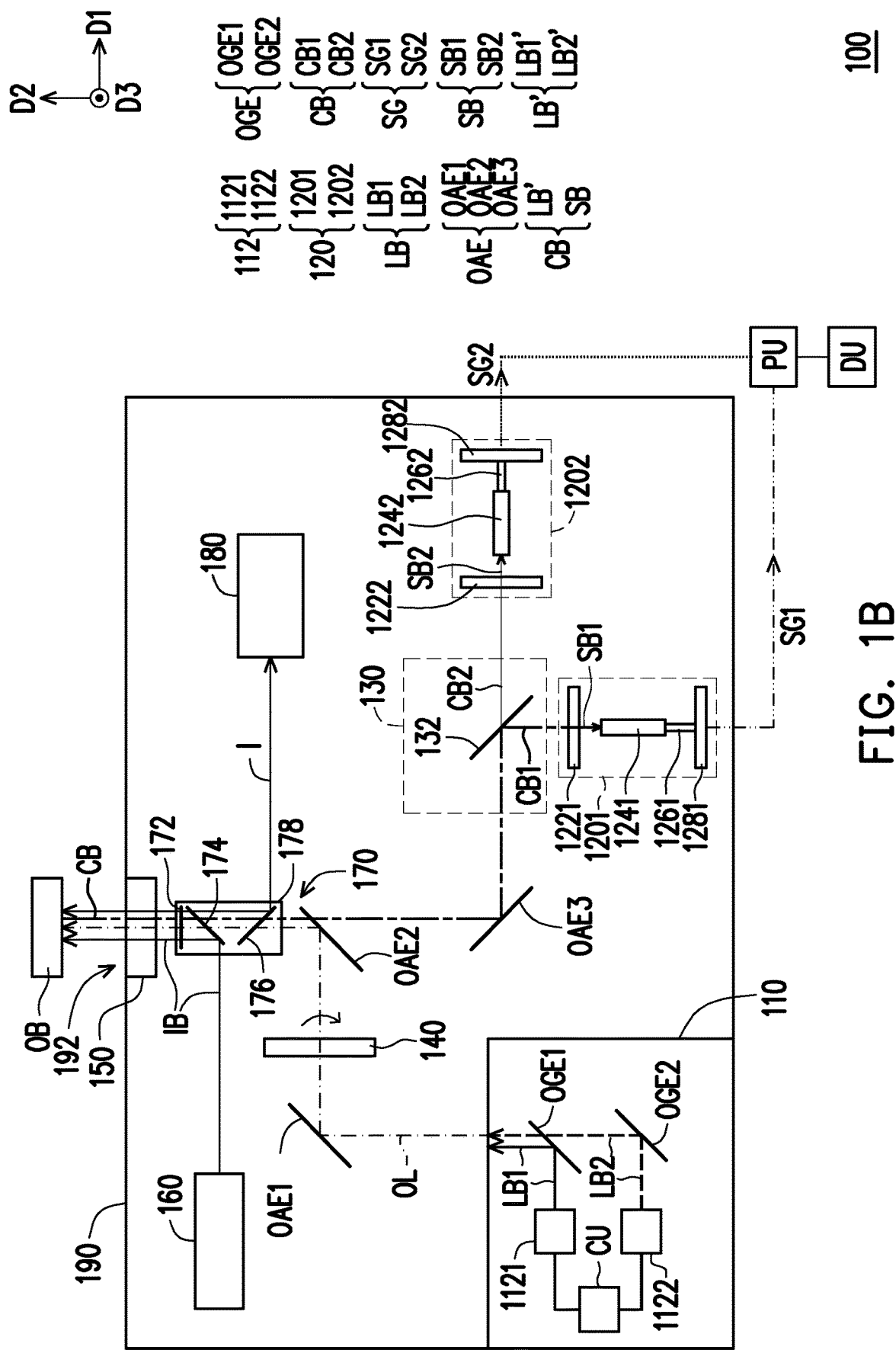
Figure 2:
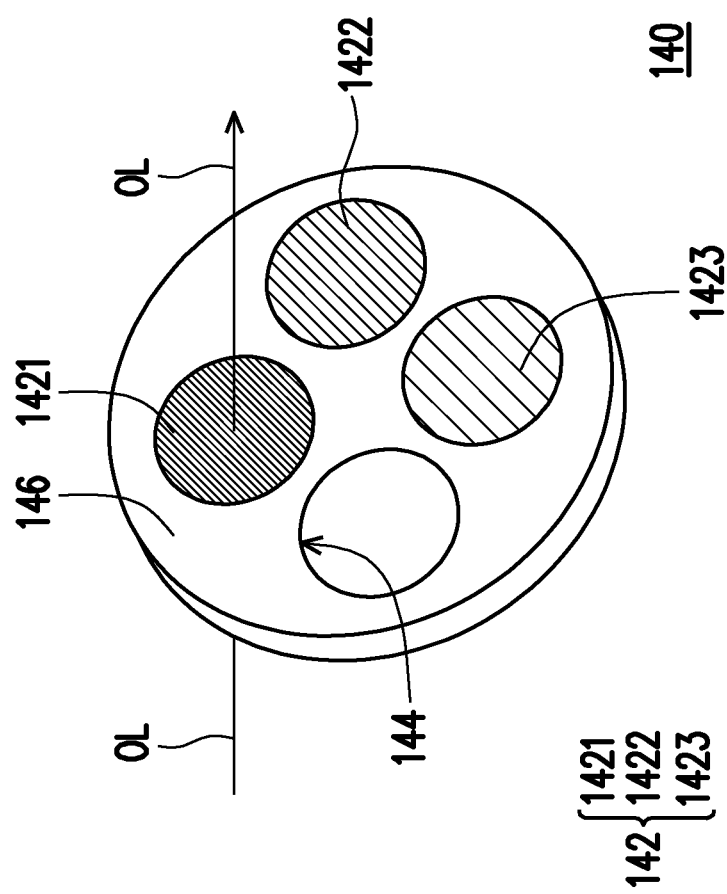
FIG. 2 is a schematic diagram of a light attenuating module in FIG. 1.
Figure 3:
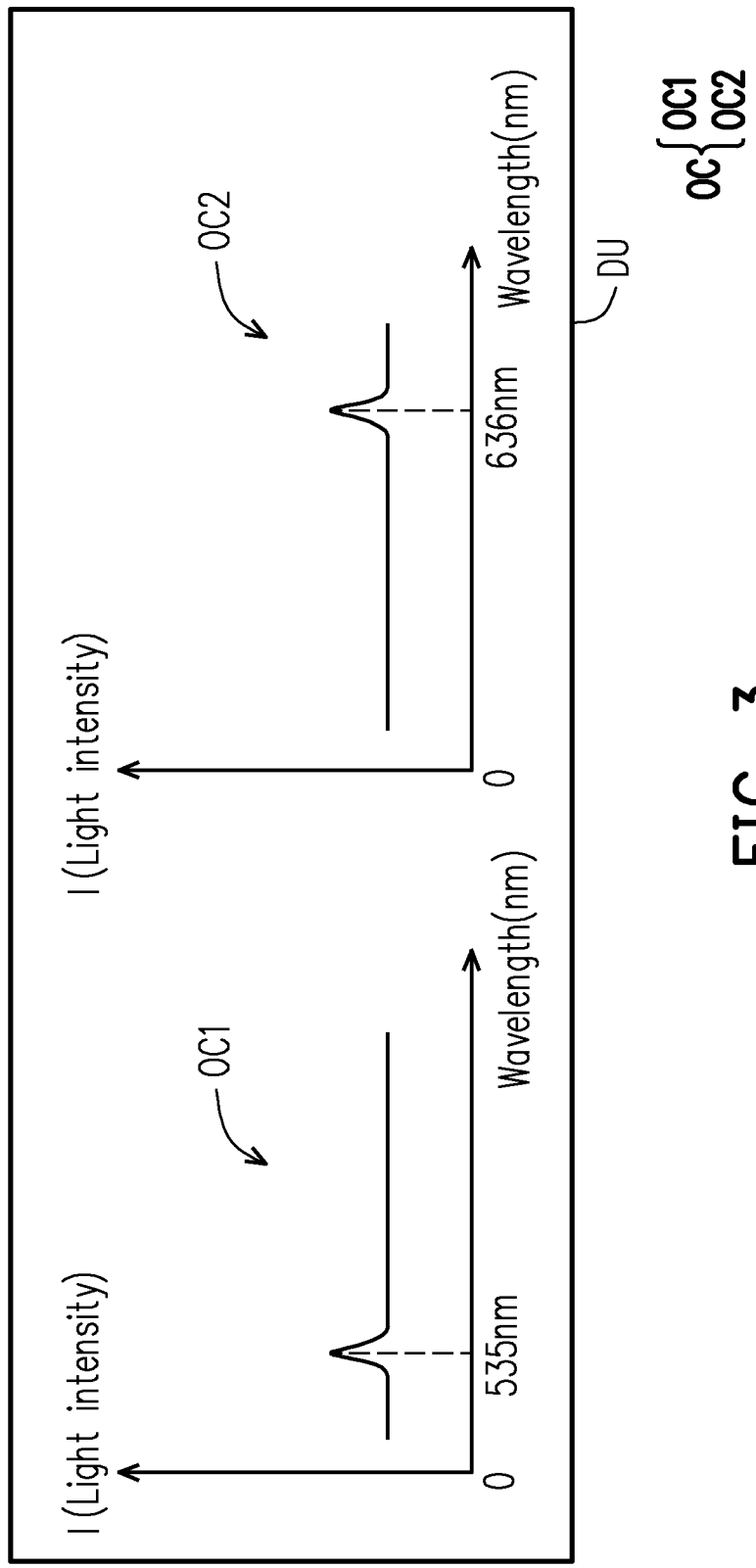
FIG. 3 is a schematic diagram of a plurality of output curves displayed on a display apparatus in FIG. 1.

FIGS. 1A and 1B are schematic diagrams of light paths of a spectrum measurement system under different operation modes of one embodiment of the present invention. FIG. 2 is a schematic diagram of a light attenuating module in FIG. 1. FIG. 3 is a schematic diagram of a plurality of output curves displayed on a display apparatus in FIG. 1.

Referring to FIGS. 1A and 1B, in the present embodiment, a spectrum measurement system 100 includes a laser light source system 110, an optical signal receiving system 120, a beam splitting system 130, a light attenuating module 140, an objective lens 150, an illuminating element 160, a switching module 170, an image capturing device 180, a shell 190, a plurality of optical adjusting elements OAE, a processor PU and a display apparatus DU. The configuration relations between all the above elements will be described in detail in the following paragraphs.

The laser light source system 110 is a light source system configured to output a laser output light beam OL, and includes a plurality of laser light sources 112, a plurality of optical guide elements OGE and a controller CU. In the present embodiment, the laser light source system 110 is, for example, disposed at the lower left corner in the shell 190, but it is not limited thereto. The configuration relations between all the above elements in the laser light source system 110 will be described in detail in the following paragraphs.

The laser light sources 112 are light sources capable of emitting peak-wavelength lasers LB. The peak-wavelength lasers LB are configured to provide lights, or detection beams, required for detecting an object OB. The type of the laser light sources 112 is, for example, a Laser Diode (LD), a Diode-Pumped Solid-State (DPSS) laser, a gas laser, a liquid laser, a semiconductor laser or other suitable lasers. In the present embodiment, a plurality of laser light sources 112 are provided, for example, two laser light sources 112 are provided and respectively marked as 1121 and 1122. Peak wavelengths of these peak-wavelength lasers LB are different from one another. For example, the laser light sources 1121 and 1122 respectively emit a first peak-wavelength laser LB1 and a second peak-wavelength laser LB2. The peak wavelength of the first peak-wavelength laser LB1 is, for example, 532 nm, and the peak wavelength of the second peak-wavelength laser LB2 is, for example, 633 nm. The peak wavelength is corresponded to the highest intensity in a spectrum. In other embodiments, the laser light sources 112 also may use peak wavelengths of 405 nm, 473 nm, 488 nm, 785 nm, 808 and 1,064 nm or other suitable peak wavelengths. A person of ordinary skill in the art can select the type, the number or the peak wavelength of the laser light sources 112 according to own requirements, and the present invention is not limited thereto.

The optical guide elements OGE are optical elements configured to adjust light paths of the peak-wavelength lasers LB in the laser light source system 110. In the present embodiment, for example, two optical guide elements OGE are provided and respectively marked as OGE1 and OGE2, but the number is not limited thereto. The optical guide elements OGE1 and OGE2 are respectively disposed on the light paths of the laser light sources 1121 and 1122. The optical guide element OGE1 is configured to reflect the first peak-wavelength laser LB1 and may be penetrated by the second peak-wavelength laser LB2. The optical guide element OGE2 is configured to reflect the second peak-wavelength laser LB2. In one embodiment, the optical guide element OGE is, for example, a dichroic mirror for beam splitting based on wavelengths (colours). In other embodiments, the optical guide element OGE may be a stripe mirror having a plurality of reflecting or penetrating parts, or a partial-penetrating or partial-reflecting mirror. When the optical guide elements OGE1 and OGE2 are the dichroic mirrors, the first and second peak wavelength lasers LB1 and LB2 are respectively green and red lasers, the optical guide element OGE1 is, for example, the dichroic mirror that may reflect green light and allow light beams other than the green light to penetrate through, and the optical guide element OGE2 is, for example, the dichroic mirror that may reflect red light and allow light beams other than the red light to penetrate through, so that the first and second peak wavelength lasers LB1 and LB2 may be transmitted along the direction D2. When the optical guide elements OGE1 and OGE2 are stripe mirrors, a light outlet of the laser light source 1121 may be aligned with the reflecting part of the optical guide element OGE1, and a light outlet of the laser light source 1122 may be aligned with the reflecting part of the optical guide element OGE2, and furthermore, the reflecting part of the optical guide element OGE2 is corresponded to the penetrating part of the optical guide element OGE1, so that the first and second peak wavelength lasers LB1 and LB2 may be transmitted along the direction D2. A person of ordinary skill in the art can correspondingly select different types of optical guide elements OGE to design the optical configuration in the laser light source system 110, and the present invention is not limited thereto.

The controller CU is electrically connected with these laser light sources 1121 and 1122, and is configured to control these laser light sources 1121 and 1122 to emit light or not. That is, the laser light source system 110 may control via the controller CU whether the laser output light beam OL includes the first or second peak-wavelength laser LB1, LB2. The controller CU may be a calculator, a Micro Controller Unit (MCU), a Central Processing Unit (CPU), or other programmable microprocessors, a Digital Signal Processor (DSP), a programmable controller, an Application Specific Integrated Circuits (ASICs), a Programmable Logic Device (PLD), or other similar devices, and the present invention is not limited thereto. Moreover, in one embodiment, all functions of the controller CU may be implemented as a plurality of program codes. These program codes may be stored in one memory and executed by the controller CU. Alternatively, in one embodiment, all functions of the controller CU may be implemented as one or more circuits. The present invention is not limited to implementing the various functions of the controller CU by means of software or hardware.

The optical signal receiving system 120 is a signal receiving system configured to receive spectral signals from the object OB. In the present embodiment, the optical signal receiving system 120 includes first and second signal receivers 1201 and 1202. The first and second signal receivers 1201 and 1202 are configured to respectively receive spectral signals CB1 and CB2 generated by converting the corresponding first and second peak-wavelength lasers LB1 and LB2 after the object OB is irradiated. The number of the signal receivers included in the optical signal receiving system 120 is not limited to two. The structure of each of the signal receivers is the same or similar, so the first signal receiver 1201 will be described below as an example. The structure of the second signal receiver 1202 is the same as that of the first signal receiver 1201. In the figure, the two receivers are distinguished by the last different digits of their numerals, and the rests are the same. The first signal receiver 1201 includes a light filter element 1221, an optical collimator 1241, an optical signal channel 1261 and a photoelectric conversion element 1281. In the present embodiment, the optical signal receiving system 120 is disposed at the right lower corner of the shell 190. The configuration relations between all the above elements will be described in detail in the following paragraphs.

The light filter element 1221 is configured to filter out a light beam within a specific wavelength range, and allows light beams other than the light beam within the specific wavelength range to penetrate through. In the present embodiment, the light filter element 1221 is, for example, a light filter, but it is not limited thereto. The light filter element 1221 is configured at a light entering position in the first signal receiver 1201 and is optically coupled to the beam splitting system 130. Generally, during spectrum measurement of the object OB, the first and second peak-wavelength lasers LB1 and LB2 irradiate the object OB; one part of the detected peak-wavelength laser is converted into first and second spectral signals SB1 and SB2 through physical phenomena such as vibration, rotation and scattering of lattices or molecules of the object OB, while the other part of peak-wavelength laser LB' (including the first and second peak-wavelength lasers) may still become a conversion beam CB together with these spectral signals SB; the conversion beam CB is received by the optical signal receiving system 120 after entering the light paths, and then subjected to subsequent spectral signal analysis to achieve a detection purpose. The corresponding first peak-wavelength laser LB1 in the conversion beam CB may be filtered out through the light filter element 1221, so as to avoid the influence of the first peak-wavelength laser LB1 on a measurement result.

The optical collimator 1241 is an optical element configured to collimate/centralize a light beam, and is configured to allow the light beam to be transmitted in a nearly parallel way so as to avoid light energy dissipation caused by light beam scattering. The optical collimator 1241 is optically coupled to the light filter element 1221 and the optical signal channel 1261.

The optical signal channel 1261 is any optical element that may transmit an optical signal, such as an optical fibre or a waveguide, but it is not limited thereto. The optical signal channel 1261 is optically coupled to the optical collimator 1241 and the photoelectric conversion element 1281.

The photoelectric conversion element 1281 is a photoelectric element that may convert an optical signal into an electrical signal, such as a Charge-Coupled Device (CCD) (also referred to as a photosensitive coupled element) or a Complementary Metal Oxide Semiconductor (CMOS), but it is not limited thereto. In the present embodiment, the first and second signal receivers 1201 and 1202 respectively have photoelectric conversion elements 1281 and 1282. In other implementations (not shown in the figure), the first and second signal receivers 1201 and 1202 may also share the same photoelectric conversion element. Moreover, the photoelectric conversion element 1281 may be located inside the first signal receiver 1201, or may be located outside the first signal receiver 1201, and even may be located outside the shell 190 and integrated with a processor system.

The beam splitting system 130 is a beam splitter assembly for splitting one or more light beams in different light exiting paths. In the present embodiment, the beam splitting system 130 and the optical signal receiving system 120 are disposed at the lower right corner of the shell 190. In the spectrum measurement system of the embodiment of the present invention, there is more than one beam splitting or combining device according to different requirements, while the beam splitting system 130 is the last beam splitting device before the conversion beam CB enters the optical signal receiving system 120. In the present embodiment, the beam splitting system 130 includes at least one beam splitter 132. For example, one beam splitter 132 is included, but it is not limited thereto. The beam splitter 132 is configured to reflect a light beam within a specific wavelength range and allow light beams other than the light beam within the specific wavelength range to penetrate through, so as to cause the light beams to travel in different light exiting paths. The mechanism of another beam splitter 132 allows the light beam within the specific wavelength range to penetrate through and reflect light beams other than the light beam within the specific wavelength range. The beam splitter 132 also may use the above-mentioned dichroic mirror or stripe mirror. For example, it may be the dichroic mirror that reflects green light and allow lights other than the green light to penetrate through. Beam splitters of any forms are not limited to the application of the present invention. In the present embodiment, the beam splitter 132 reflect the first conversion beam CB1, corresponded to the first peak-wavelength laser LB1, in the conversion beam CB to the first signal receiver 1201 and allow the second conversion beam CB1 corresponded to the second peak-wavelength laser LB2 to penetrate through and be transmitted to the second signal receiver 1202. The first conversion beam CB1 includes the first spectral signal SB1 and the part of first peak-wavelength laser LB1', and the second conversion beam CB2 includes the second spectral signal SB2 and the part of second peak-wavelength laser LB2'.

The light attenuating module 140 is a light attenuating element assembly capable of selectively attenuating the light intensity of a light beam. Referring to FIGS. 1A, 1B and 2, in the present embodiment, the light attenuating module 140 includes a plurality of light attenuating mirrors 142 having different penetration rates, a through hole 144 and a rotating mechanism 146. For example, three light attenuating mirrors 142 are provided and respectively marked as 1421, 1422 and 1423, but the number is not limited thereto. For example, the light attenuating mirrors 1421, 1422 and 1423 may respectively have penetration rates of 1/2, 1/10 and 1/100, but the penetration rates are not limited thereto. These light attenuating mirrors 142 and the through hole 144 are disposed on the rotating mechanism 146 and may be selectively switched into the light path of the laser output light beam OL, so as to selectively adjust the intensity of the laser output light beam OL.

The objective lens 150 is a lens group that firstly receives the light beam from the object OB in the spectrum measurement system 100, and may consist of one to more lenses having refractive indexes.

The illuminating element 160 is an optical element capable of emitting an illuminating beam IB, and is, for example, disposed at the upper left corner of the shell 190. Referring to FIG. 1B, the illuminating beam IB is configured to irradiate the object OB to form an image beam I. The type of the illuminating element 160 is, for example, a light emitting diode (LED), an organic light emitting diode (OLED), or other optical element suitable for illumination, but it is not limited thereto. In the present embodiment, the illuminating beam IB is, for example, white light, but it is not limited thereto.

The switching module 170 is, for example, an optical mechanism module for switching different operation modes of the spectrum measurement system 100 by switching in or out the laser light path of the laser output light beam OL, and is, for example, disposed at the upper right corner of the shell 190. Referring to FIGS. 1A and 1B, in the present embodiment, the switching module 170 includes a light attenuating mirror 172, beam splitters 174 and 176, a carrier substrate 178 and a slide rail (not shown). The light attenuating mirror 172 is an optical element for attenuating the intensity of a light beam. The light attenuating mirror 172 and the beam splitters 174 and 176 are all disposed on the carrier substrate 178. The carrier substrate 178 is slidably disposed on the slide rail. Therefore, the carrier substrate 178 may move between two positions as shown in FIGS. 2A and 2B by the slide rail, and the positions of the light attenuating mirror 172 and the beam splitters 174 and 176 which are disposed thereon are also changed therewith.

The image capturing device 180 is an optical element configured to acquire the image beam I from the object OB, and is, for example, disposed at the upper right corner of the shell 190. The image capturing device 180 is, for example, a camera. In other embodiments, the image capturing device 180 also may be an eyepiece, and the user may observe the object OB via the eyepiece. The present invention is not limited thereto.

The shell 190 is configured to accommodate at least one part of elements of the spectrum measurement system 100, and provides a protection function for the above elements. Specifically, the shell 190 is configured to accommodate the laser light source system 110, the optical signal receiving system 120, the beam splitting system 130, the light attenuating module 140, the objective lens 150, the illuminating element 160, the switching module 170 and a plurality of optical adjusting elements OAE. The shell 190 has a light inlet/outlet 192. The light inlet/outlet 192 is provided with the objective lens 150, and the position of the object OB is corresponded to the light inlet/outlet 192.

The optical adjusting element OAE is an element configured to adjust the light path, light type or optical properties of a light beam, and the type of the optical adjusting element OAE is, for example, a reflector, a concave mirror, a convex mirror, a light converging lens, a beam splitter, a light diverging lens, or a combination thereof. In the present embodiment, for example, three optical adjusting elements OAE are provided and respectively marked as OAE1 to OAE3. The optical adjusting elements OAE1 and OAE3 are, for example, reflectors, and the optical adjusting element OAE2 is a beam splitter, and beam splitter is, for example, a partial-penetrating and partial-reflecting mirror, but it is not limited thereto.

The processor PU is electrically connected to the photoelectric conversion elements 128 in these signal receivers 120 and the display apparatus DU, and is configured to receive one to more electrical output signals SG from these photoelectric conversion elements 128, and analyses the one to more electrical output signals SG, so as to display one to more output curves OC on the display apparatus DU.

The display apparatus DU has a display interface that may selectively display one to more output curves OC for watching by the user. In the present embodiment, the display apparatus DU is, for example, a liquid crystal display apparatus, a light emitting diode display apparatus, an organic light emitting diode display apparatus, or other types of display apparatus, but it is not limited thereto.

The object OB may be, for example, various solid, liquid or gaseous substances, and the present invention is not limited thereto.

The spectrum measurement system 100 of the present embodiment has two operation modes, i.e. a measurement mode and an observation mode. Light path actions and effects of the spectrum measurement system 100 of the present embodiment under different operation modes (the measurement mode and the observation mode) will be described in detail in the following paragraphs.

Firstly, the light path actions and effects of the spectrum measurement system 100 under the measurement mode are described.

Referring FIG. 1A at first, under the measurement mode, the controller CU, for example, sends control signals to the laser light sources 1121 and 1122 so as to allow the laser light sources 1121 and 1122 to emit the first and second peak-wavelength lasers LB1 and LB2. The first peak-wavelength laser LB1 is reflected by the optical guide element OGE1 and then transmitted along the direction D2. The second peak-wavelength laser LB2 is reflected by the optical guide element OGE2 and then transmitted along the direction D2 and penetrates through the optical guide element OGE1. Accordingly, the first and second peak-wavelength lasers LB1 and LB2 may be emitted along the same direction D2. That is, the first and second peak-wavelength lasers LB1 and LB2 are output as the laser output light beam OL together to the laser light source system 110.

Then, the laser output light beam OL is reflected by the optical adjusting element OAE1 and transmitted along the direction D1, penetrates through the light attenuating module 140, is reflected by the optical adjusting element OAE2 and transmitted along the direction D2, and penetrates through the objective lens 150 (the light inlet/outlet 192) in sequence, and then is transmitted to the object OB. After being irradiated by the laser output light beam OL, the object OB generates the conversion beam CB. Specifically, after the first and second peak-wavelength lasers LB1 and LB2 react with molecules of the object OB, one part of each of the first and second peak-wavelength lasers LB1 and LB2 collides with the molecules of the object OB to cause energy exchange to change the original energy of photons, and then is emitted in the form of scattered light. Such first and second peak-wavelength lasers LB1 and LB2 reacting with the object OB respectively forms the first and second spectral signals SB1 and SB2 after the above conversion process. In other words, the first and second spectral signals SB1 and SB2 are Raman spectrums, and the other parts LB1' and LB2' in the first and second peak-wavelength lasers LB1 and LB2 do not react with the object OB. Due to the above energy exchange, the peak wavelengths of the spectral signals SB are slightly different from those of the lasers LB', and this wavelength difference is called Raman shift.

Referring to FIG. 1A again, the conversion beam CB is transmitted along a direction opposite to the direction D2, then penetrates through the objective lens 150 (the light inlet/outlet 192) and the optical adjusting element OAE2 in sequence, is reflected by the optical adjusting element OAE3 and transmitted along the direction D1, and is finally transmitted to the beam splitting system 130. The beam splitter 132 reflects the first conversion beam CB1 corresponded to the first peak-wavelength laser LB1, so as to emit the first conversion beam CB1 from the light exiting path along the direction opposite to the direction D2. The second conversion beam CB2 penetrates through the beam splitter 132 and is emitted from the light exiting path along the direction D1. In other words, the beam splitting system 130 provides different light exiting paths, and these light exiting paths are respectively corresponded to different peak-wavelength lasers and respectively corresponded to the first and second signal receivers 1201 and 1202 in the optical signal receiving system 120. Specifically, the light exiting path along the direction D1 is corresponded to the second signal receiver 1202 and the second peak-wavelength laser LB2 having the peak wavelength of 633 nm, and the light exiting path along the direction opposite to the direction D2 is corresponded to the first signal receiver 1201 and the first peak-wavelength laser LB1 having the peak wavelength of 532 nm. Then, the first conversion beam CB1 and the first signal receiver 1201 are described as example. After the first conversion beam CB1 penetrates through the light filter element 1221, the light filter element 1221 is configured to filter out the part of first peak-wavelength laser LB1' to obtain the first spectral signal SB1. Generally, the intensity of the part of first peak-wavelength laser LB1' is much higher than that of the first spectral signal SB1, so that filtering out of the part of first peak-wavelength laser LB1' contributes to reading of the signal. Next, the first spectral signal SB1 is transmitted to and collimated by the optical collimator 1241 and then transmitted to the photoelectric conversion element 1281 through the optical signal channel 1261. The photoelectric conversion element 1281 correspondingly converts the first spectral signal SB1 into the electrical output signal SG1 and outputs the electrical output signal SG1 to the processor PU at the rear end. The action principle of the second conversion beam CB2 in the second signal receiver 1202 is similar to the above, and the descriptions thereof are omitted herein.

Based on the above, after the processor PU analyses the electrical output signals SG1 and SG2, the processor PU may correspondingly output a plurality of output curves OC1 and OC2 to the display apparatus DU, and the display apparatus DU may selectively display the plurality of output curves OC1 and OC2, as shown in FIG. 3, so that the user may simultaneously observe the Raman spectrums of the object OB correspondingly measured under different first and second peak-wavelength lasers LB1 and LB2. It should be noted that the peak wavelength values of 535 nm and 636 nm of the output curves OC1 and OC2 as shown in FIG. 3 are only exemplary, and the present invention is not limited thereto.

Moreover, in other embodiments, if the object OB includes a substance capable of emitting fluorescence, and the laser light source 1121 also may use a laser having a relatively large peak wavelength, such as 532 nm, the laser light source 1122 may use a laser having a relatively small peak wavelength, such as 405 nm. The first peak-wavelength laser LB1 emitted by the laser light source 1121 performs Raman spectrum measurement on the object OB. On the other aspect, when the second peak-wavelength laser LB2 emitted by the laser light source 1122 is transmitted to the object OB, the object OB is excited by one part in the second peak-wavelength laser LB2 to emit fluorescence, and this fluorescence is the second spectral signal SB2. In other words, the second spectral signal SB2 is a fluorescence spectrum. Therefore, the processor PU at the rear end may perform fluorescence spectrum (PL spectrum) measurement on the object OB according to the electrical output signal SG2 corresponded to the second spectral signal SB2. In other words, the spectrum measurement system 100 may perform various different spectrum measurements on the object OB, and is not limited to the Raman spectrum measurement. It should be noted that in the above embodiment, the fluorescence spectrum measurement is described as example. In other embodiments, other types of optical measurements also may be performed. The present invention is not limited thereto.

It should be noted that in the above measurement mode, the controller CU controls the laser light sources 1121 and 1122 to allow the two laser light sources to emit the first and second peak-wavelength lasers LB1 and LB2 and allow the processor PU to correspondingly output the two electrical output signals SG1 and SG2, so as to realize multi-wavelength measurement. In other embodiments, the controller CU also may allow the single laser light source 112 to emit the corresponding peak-wavelength laser LB and allow the processor PU to correspondingly output a single electrical output signal SG, so as to realize single-wavelength measurement. For example, if the laser light source 1121 emits the first peak-wavelength laser LB1 and the laser light source 1122 is turned off, the object OB may only correspondingly emit the first conversion beam CB1 in this case, and the beam splitting system 130 may guide the first conversion beam CB1 to the corresponding signal receiver 1201 of the signal receivers 1201 and 1202 by one of the two light exiting paths (namely the light exiting path along the direction opposite to the direction D2); and in this case, the processor PU may only receive the electrical output signal SG1, and the display apparatus DU may only display the output curve OC1, and vice versa.

Then, the light path actions and effects of the spectrum measurement system 100 under the observation mode are described.

Referring to FIG. 1B, under the observation mode, the user may switch to the light path of the laser output light beam OL via the switching module 170, and the illuminating element 160 correspondingly emits the illuminating beam IB. The illuminating beam IB is reflected by the beam splitter 174 and transmitted along the direction D2, penetrates through the objective lens 150 (the light inlet/outlet 192), and then is transmitted to the object OB in sequence. After the object OB converts the illuminating beam IB into the image beam I, the image beam I is transmitted along the direction opposite to the direction D2, then penetrates through the objective lens 150 (the light inlet/outlet 192), the light attenuating mirror 172 and the beam splitter 174 in sequence, and is reflected by the beam splitter 176 and transmitted along the direction D1, and finally is transmitted to the image capturing device 180, so as to acquire an image of the object OB.

At this point, the different operation modes of the spectrum measurement system of the present embodiment have been substantially described.

Based on the above, in the spectrum measurement system 100 of the present embodiment, the beam splitting system 130 provides the plurality of light exiting paths respectively corresponded to the first and second signal receivers 1201 and 1202. These light exiting paths are configured to respectively transmit the first and second spectral signals SB1 and SB2 to the first and second signal receivers 1201 and 1202. Therefore, the spectrum measurement system 100 may simultaneously measure multiple wavelengths, and also may avoid an action of replacing the signal receivers and corresponding optical fiber plugging, unplugging and collimating flows, so that the spectrum measurement system 100 may provide a simple operation flow for the user. Furthermore, the beam splitter 132 of the beam splitting system 130 correspondingly has reflecting and penetrating effects according to different wavelengths and is simple in structure, relatively small in occupation size and low in manufacturing cost, so that the spectrum measurement system 100 is relatively small in size and low in manufacturing cost.

It must be noted herein that the following embodiments use part of contents of the foregoing embodiments, and the descriptions of the same technical contents are omitted. The same element names may refer to the part of contents of the foregoing embodiments, and repeated descriptions will be omitted in the following embodiments.

Figure 4:
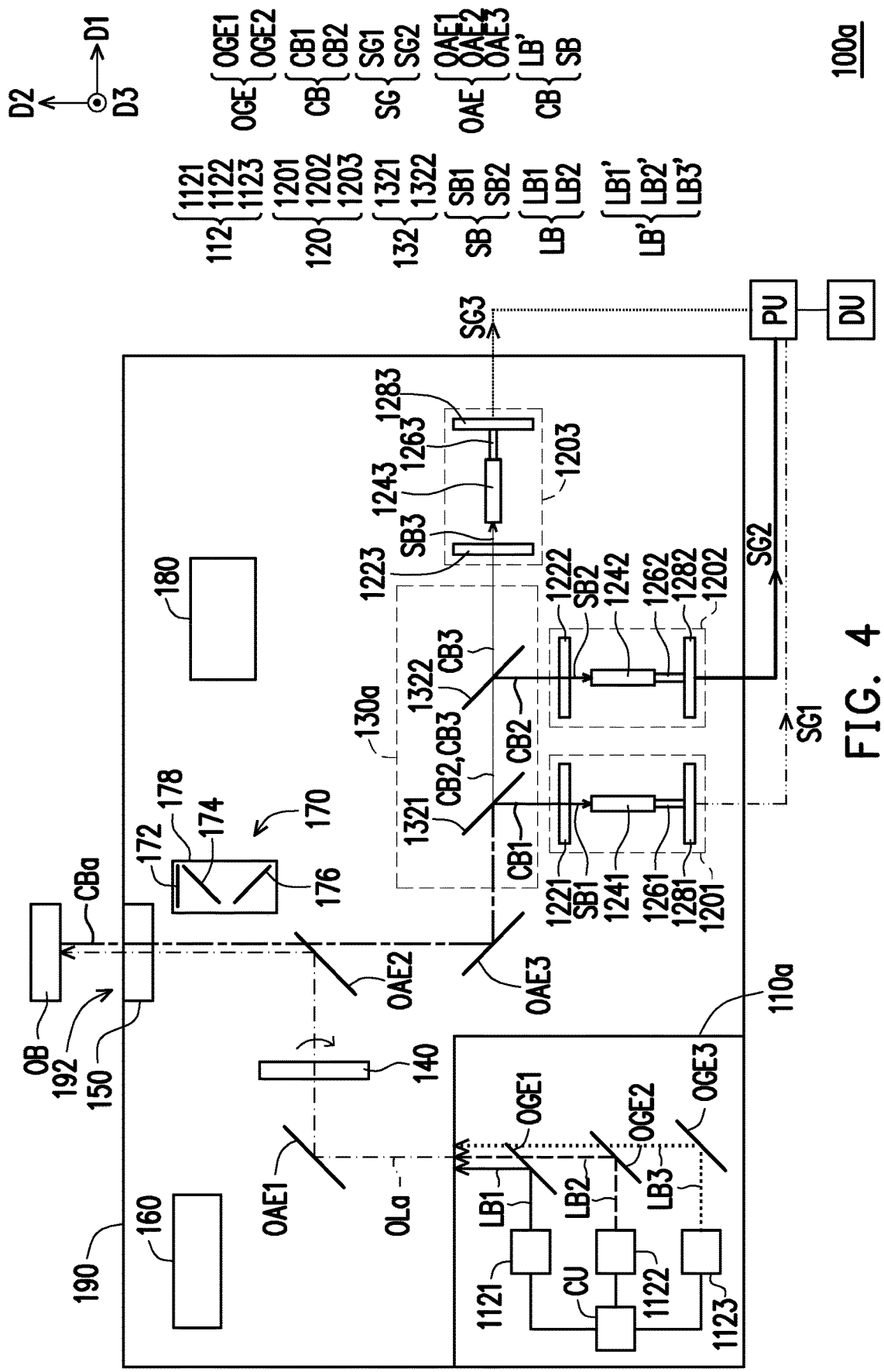
FIGS. 4 to 6 respectively illustrate internal light path schematic diagrams of spectrum measurement systems of a plurality of different embodiments.
Figure 5:
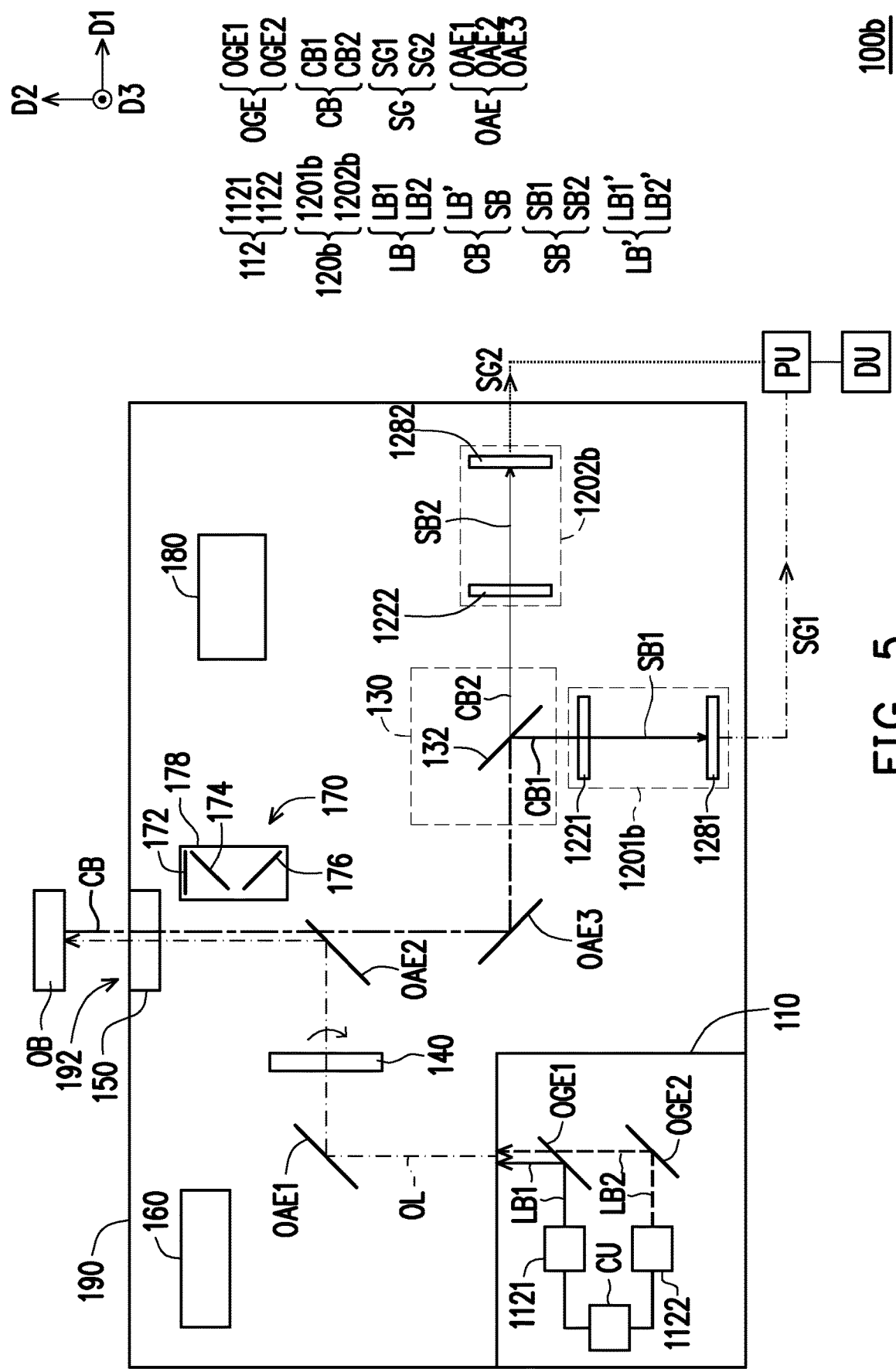
Figure 6:
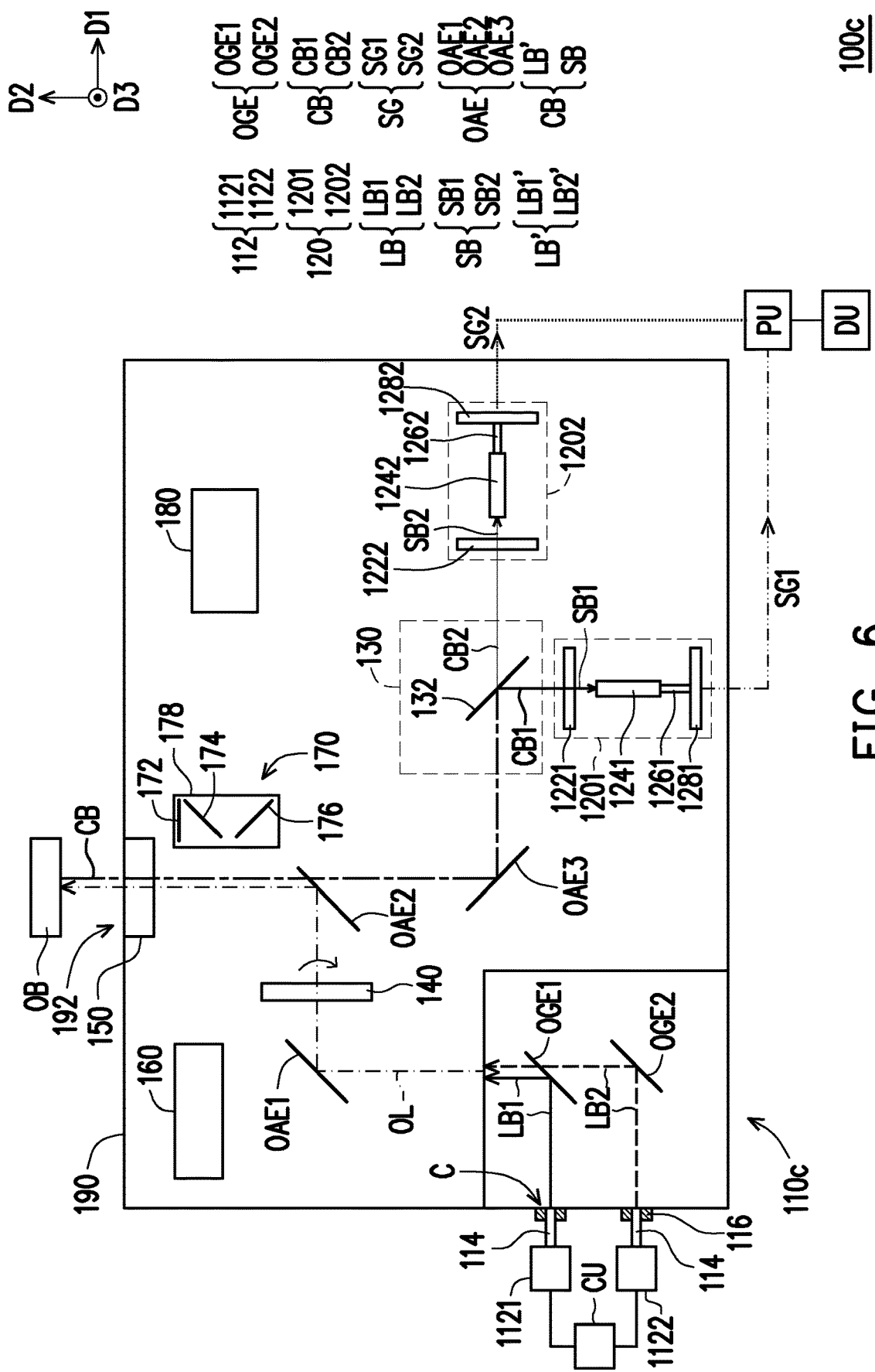

FIGS. 4 to 6 respectively illustrate internal light path schematic diagrams of spectrum measurement systems of a plurality of different embodiments.

Referring to FIG. 4, the structure of a spectrum measurement system 100a is substantially similar to that of the spectrum measurement system 100. A main difference in the structure is that: there are a plurality of beam splitters 132 in a beam splitting system 130a, and the number of laser light sources 112 of a laser light source system 110a and the number of optical guide elements OGE each are one more than the number of the beam splitters 132. For example, there are two beam splitters 132, respectively marked as 1321 and 1322; there are three laser light sources 112, respectively marked as 1121 to 1123; and there are three optical guide elements OGE, respectively marked as OGE1 to OGE3. Moreover, the positions of second and third signal receivers 1202 and 1203 are respectively located below and on the right of the beam splitter 1322. The peak wavelength of a third peak-wavelength laser LB3 emitted by the laser light source 1123 is different from those of the laser light sources 1121 and 1122, and is, for example, 785 nm, but it is not limited thereto. The optical guide element OGE2 also may be penetrated by the third peak-wavelength laser LB3 in addition to reflecting the second peak-wavelength laser LB2. The optical guide element OGE3 is configured to reflect the third peak-wavelength laser LB3. The function of the beam splitter 1321 is the same as that of the beam splitter 132 of FIG. 1A, and the descriptions thereof are omitted herein. The beam splitter 1322 is configured to reflect the second conversion beam CB2 and may allow the third conversion beam CB3 corresponded to the third peak-wavelength laser LB3 to penetrate through. The third conversion beam CB3 includes the third spectral signal SB3.

Referring to FIG. 4 again, optical behaviours of the spectrum measurement system 100a are substantially similar to those of the spectrum measurement system 100. A main difference is that: after being emitted, the third peak-wavelength laser LB3 is reflected by the optical guide element OGE3 and transmitted along the direction D2, so that the first to third peak-wavelength lasers LB1 to LB3 are output as the laser output light beam OLa together to the laser light source system 110a. Then, after the laser output light beam OLa is transmitted to the object OB, the object OB converts the first to third peak-wavelength lasers LB1 to LB3 into a conversion beam CBa. When the conversion beam CBa is transmitted to the beam splitting system 130a, the second conversion beam CB2, corresponded to the second peak-wavelength laser LB2, in the conversion beam CBa penetrates through the beam splitter 1321 and then is reflected by the beam splitter 1322 and emitted to the corresponding second signal receiver 1202 from the light exiting path along the direction opposite to the direction D2. The third conversion beam CB3, corresponded to the third peak-wavelength laser LB3, in the conversion beam CBa penetrates through the beam splitters 1321 and 1322 in sequence and is emitted to the corresponding third signal receiver 1203 from the light exiting path along the direction D1. Optical behaviours of the first conversion beam CB1 are similar to those of the embodiment of FIG. 1A, and the descriptions thereof are omitted herein.

Referring to FIG. 5, the structure of a spectrum measurement system 100b is substantially similar to that of the spectrum measurement system 100. A main difference in the structure is that: a first signal receiver 1201b includes a light filter element 1221 and a photoelectric conversion element 1281, and is not provided with the optical collimator 124 and the optical signal channel 126 as shown in FIGS. 1A and 1B. Therefore, the spectrum measurement system 100b of the present embodiment is lower in manufacturing cost.

Referring to FIG. 5 again, optical behaviours of the spectrum measurement system 100b are substantially similar to those of the spectrum measurement system 100. A main difference in the optical behaviours is that: a first spectral signal SB1 is directly transmitted to the photoelectric conversion element 1281 through the light filter element 1221 without passing through other elements. The structure and optical behaviours of a second signal receiver 1202b are similar to those of the first signal receiver 1201b, and the descriptions thereof are omitted herein.

Referring to FIG. 6, the structure of a spectrum measurement system 100c is substantially similar to that of the spectrum measurement system 100. A main difference in the structure is that: a laser light source system 110c further includes a plurality of light guide channels 114 and a plurality of adjusting mechanisms 116. The forms and functions of the light guide channels 114 are as described as the optical signal channel 126, and the descriptions thereof are omitted herein. Two ends of each of these light guide channels 114 are respectively connected to the light outlet of the corresponding laser light source 112 and the shell 190. These adjusting mechanisms 116 are respectively disposed at a plurality of joints C between these light guide channels 114 and the shell 190. Each adjusting mechanisms 116 is configured to adjust the position of the corresponding light guide channel 114, so as to adjust the light entering positions of the first and second peak-wavelength lasers LB1 and LB2.

Referring to FIG. 6 again, optical behaviours of the spectrum measurement system 100c are substantially similar to those of the spectrum measurement system 100. A main difference in the optical behaviours is that: the first and second peak-wavelength lasers LB1 and LB2 are transmitted to the optical guide elements OGE located in the shell 190 via the light guide channels 114 after being emitted.

Based on the above, in the spectrum measurement system of the present embodiment, the beam splitting system provides the plurality of light exiting paths. These light exiting paths are configured to respectively transmit the first and second spectral signals to the first and second signal receivers. Therefore, the spectrum measurement system may simultaneously measure multiple wavelengths, and may avoid an action of replacing the signal receivers and corresponding optical fiber plugging, unplugging and collimating flows, so that the spectrum measurement system may provide a simple operation flow for the user. For example, the spectrum measurement system may measure spectrums which may be of the same or different properties and are generated by two (or more) light sources at one time (for example, the spectrums may be both the Raman spectrums, or one light source is configured to measure the Raman spectrum, and the other light source is configured to measure a fluorescence spectrum), so that the number of times of replacing elements and software may be greatly reduced, and the operation is easy. Furthermore, the beam splitter adopted in the beam splitting system correspondingly has the reflecting and penetrating effect according to different wavelengths and is simple in structure, relatively small in occupation size and low in manufacturing cost, so that the spectrum measurement system is relatively small in size and relatively low in manufacturing cost. Moreover, the spectrum measurement system may display the plurality of output curves corresponded to different working wavelengths, so that the user can observe measurement results thereof.

Although the present invention has been disclosed by the embodiments above, the embodiments are not intended to limit the present invention, and a person of ordinary skill in the art can make some changes and embellishments without departing from the spirit and scope of the present invention. Therefore, the protection scope of the present invention is defined by the scope of the attached claims.

What is claimed is:

1. A spectrum measurement system, configured to measure optical information of an object, the spectrum measurement system comprising:
   a laser light source system, configured to emit a laser output light beam to the object, wherein the laser output light beam comprises at least a first peak-wavelength laser and a second peak-wavelength laser; after the object is radiated by the laser output light beam, the object generates a conversion beam; the conversion beam comprises at least one of a first spectral signal and a second spectral signal; the first spectral signal is corresponded to the first peak-wavelength laser, and the second spectral signal is corresponded to the second peak-wavelength laser;
   an optical guide element, disposed on a light path of the laser output light beam between the laser light source system and the object, wherein the first peak-wavelength laser is reflected by the optical guide element before irradiating the object and the second peak-wavelength laser penetrates through the optical guide element before irradiating the object;
   an optical signal receiving system, comprising at least a first signal receiver and a second signal receiver respectively and simultaneously configured to receive the first spectral signal and the second spectral signal,
   wherein the first signal receiver comprises a first optical collimator configured to receive and collimate the first spectral signal, and the second signal receiver comprises a second optical collimator configured to receive and collimate the second spectral signal;
   a beam splitting system, located on a transmission path of the conversion beam and disposed in front of the optical signal receiving system, wherein the beam splitting system provides a plurality of light exiting paths configured to respectively transmit the first and second spectral signals to the first and second signal receivers; and
   a shell, comprising a light inlet/outlet, wherein the optical signal receiving system and the beam splitting system are disposed inside the shell, the position of the object is corresponded to the light inlet/outlet,
   wherein the laser light source system is disposed outside the shell; the laser light source system further comprises a plurality of light guide channels; the plurality of light guide channels are respectively optically coupled to a plurality of laser light sources and the shell; and each light guide channel is configured to guide the first or second peak-wavelength laser emitted by the laser light source system into the shell.

2. The spectrum measurement system according to claim 1, wherein the spectral signals are Raman spectrums.

3. The spectrum measurement system according to claim 1, wherein the beam splitting system comprises a first beam splitter; the first beam splitter allows the first spectral signal in the conversion beam to penetrate through, and reflect other spectral signals.

4. The spectrum measurement system according to claim 3, wherein the beam splitting system further comprises a second beam splitter; the second beam splitter allow the second spectral signal in the conversion beam to penetrate through, and reflect other spectral signals.

5. The spectrum measurement system according to claim 1, wherein the beam splitting system comprises a first beam splitter; the first beam splitter reflects the first spectral signal in the conversion beam, and allow other spectral signals to penetrate through.

6. The spectrum measurement system according to claim 5, wherein the beam splitting system further comprises a second beam splitter; the second beam splitter reflect the second spectral signal in the conversion beam, and allow other spectral signals to penetrate through.

7. The spectrum measurement system according to claim 1, wherein the first signal receiver further comprises: a photoelectric conversion element, configured to convert the first spectral signal into an electrical output signal.

8. The spectrum measurement system according to claim 7, wherein the first signal receiver further comprises:
   an optical signal channel, optically coupled to the first optical collimator and the photoelectric conversion element, wherein the optical signal channel is configured to receive the first spectral signal from the first optical collimator and output the first spectral signal to the photoelectric conversion element.

9. The spectrum measurement system according to claim 7, further comprising a processor and a display apparatus, wherein the processor is electrically connected to the optical signal receiving system and the display apparatus; the processor is configured to receive the electrical output signal generated by the photoelectric conversion element, and generate an output curve according to the electrical output signal, and the output curve is displayed on the display apparatus.

10. The spectrum measurement system according to claim 1, wherein the laser light source system further comprises a controller, configured to control whether the laser output light beam comprises the first peak-wavelength laser or the second peak-wavelength laser.

11. The spectrum measurement system according to claim 1, wherein the laser light source system is disposed inside the shell.

\* \* \* \* \*